US012640903B2

(12) United States Patent
Cheon et al.

(10) Patent No.: US 12,640,903 B2
(45) Date of Patent: May 26, 2026

(54) METHOD FOR HOMOMORPHIC ENCRYPTION OR DECRYPTION IN CONSIDERATION OF SPATIAL COMPLEXITY

(71) Applicant: CRYPTO LAB INC., Seoul (KR)

(72) Inventors: Jung Hee Cheon, Seoul (KR); Younho Lee, Seoul (KR); Taekyung Kim, Seoul (KR); Dongyeon Hong, Seoul (KR)

(73) Assignee: CRYPTO LAB INC., Seoul (KR)

( * ) Notice: Subject to any disclaimer, the term of this patent is extended or adjusted under 35 U.S.C. 154(b) by 306 days.

(21) Appl. No.: 17/996,990

(22) PCT Filed: Jul. 5, 2021

(86) PCT No.: PCT/KR2021/008476
§ 371 (c)(1),
(2) Date: Oct. 24, 2022

(87) PCT Pub. No.: WO2023/282359
PCT Pub. Date: Jan. 12, 2023

(65) Prior Publication Data
US 2024/0235809 A1      Jul. 11, 2024

(51) Int. Cl.
*H04L 29/06*        (2006.01)
*H04L 9/00*         (2022.01)
(52) U.S. Cl.
CPC .................................... *H04L 9/008* (2013.01)
(58) Field of Classification Search
CPC .................................................... H04L 63/102
See application file for complete search history.

(56) References Cited

U.S. PATENT DOCUMENTS

| | | | |
|---|---|---|---|
| 10,778,409 | B2 | 9/2020 | Cheon et al. |
| 11,101,976 | B2 | 8/2021 | Cheon et al. |
| 11,115,182 | B2 | 9/2021 | Cheon et al. |
| 11,115,183 | B2 | 9/2021 | Cheon et al. |

(Continued)

FOREIGN PATENT DOCUMENTS

| | | |
|---|---|---|
| KR | 20180013064 A | 2/2018 |
| KR | 101965628 B1 | 4/2019 |

(Continued)

OTHER PUBLICATIONS

International Search Report for PCT/KR2021/008476 filed on Jul. 5, 2021 on behalf of Crypto Lab Inc. Mail date: Mar. 28, 2022. English translation + KR original. 7 pages.

(Continued)

*Primary Examiner* — Jeffrey C Pwu
*Assistant Examiner* — Thong P Truong
(74) *Attorney, Agent, or Firm* — Steinfl + Bruno LLP

(57)        ABSTRACT

An operation device is disclosed. The operation device includes a memory storing at least one instruction, and a processor executing the at least one instruction, wherein the processor is configured to, by executing the at least one instruction, perform decryption for a homomorphic encryption by using information for a secret key, and the secret key is expressed as a polynomial having a plurality of terms, and the information for the secret key includes information on degrees and coefficients of the plurality of respective terms.

18 Claims, 10 Drawing Sheets

(56)  References Cited

U.S. PATENT DOCUMENTS

| | | | |
|---|---|---|---|
| 2018/0109376 A1 | 4/2018 | Gentry et al. | |
| 2018/0375640 A1* | 12/2018 | Laine .................... | H04L 9/008 |
| 2019/0363871 A1 | 11/2019 | Cheon et al. | |
| 2020/0036511 A1 | 1/2020 | Cheon et al. | |
| 2020/0162235 A1 | 5/2020 | Cheon et al. | |
| 2020/0228307 A1 | 7/2020 | Cheon et al. | |
| 2020/0252199 A1 | 8/2020 | Cheon et al. | |
| 2021/0075588 A1 | 3/2021 | Khedr et al. | |
| 2022/0182220 A1* | 6/2022 | Shin ........................ | G06F 7/523 |

FOREIGN PATENT DOCUMENTS

| | | | |
|---|---|---|---|
| KR | 102040106 | B1 | 11/2019 |
| KR | 102040120 | B1 | 11/2019 |
| KR | 20200087061 | A | 7/2020 |
| KR | 20210128303 | A | 10/2021 |

OTHER PUBLICATIONS

Notice of Allowance for KR Patent Application No. 10-2020-0062855 filed on May 26, 2020 on behalf of Crypto Lab Inc. Issuance date: Dec. 28, 2021. English translation + KR Original. 6 pages.

Office Action for KR Patent Application No. 10-2020-0062855 filed on May 26, 2020 on behalf of Crypto Lab Inc. Issuance date: Jul. 9, 2021. English translation + KR Original. 11 pages.

Office Action for KR Patent Application No. 10-2020-0062855 filed on May 26, 2020 on behalf of Crypto Lab Inc. Issuance Date Nov. 12, 2021. English translation + KR original. 6 pages.

Written Opinion for PCT/KR2021/008476 filed on Jul. 5, 2021 on behalf of Crypto Lab Inc. Mail date: Mar. 28, 2022. English translation + KR original. 11 pages.

* cited by examiner

400

450

420 — MEMORY

PROCESSOR

MANIPULATION INPUT DEVICE —440

410 — COMMUNICATION DEVICE

DISPLAY —430

FIG. 4

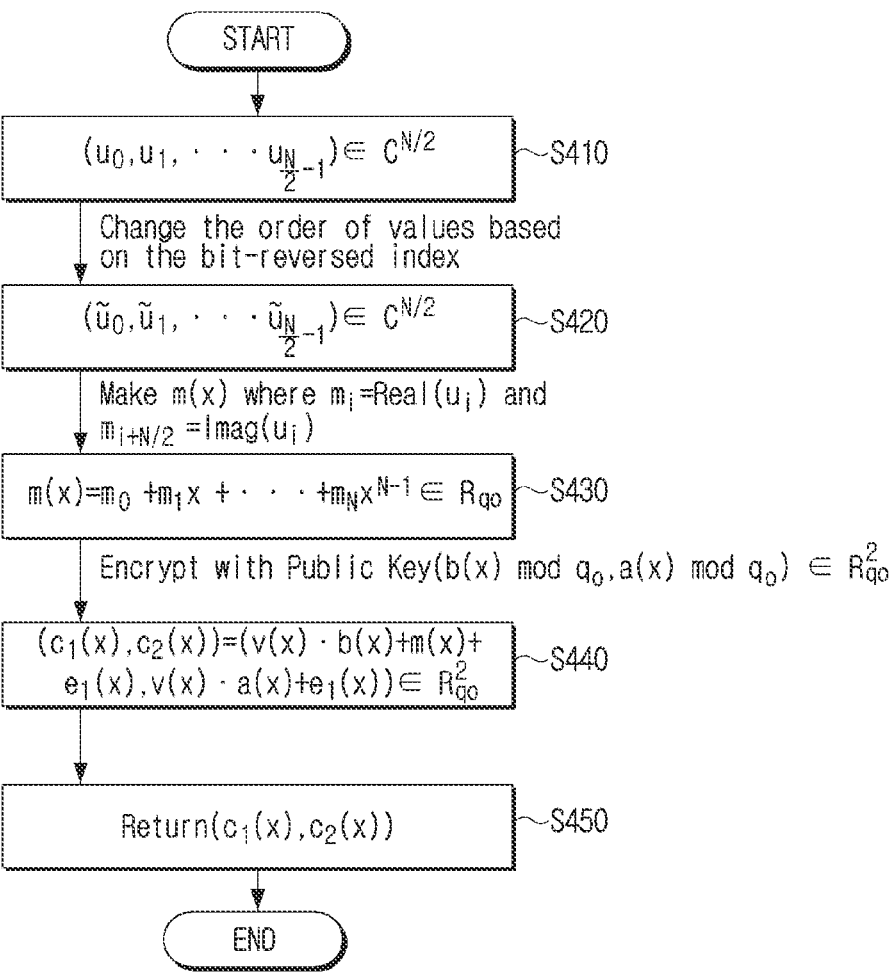

START $$(u_0, u_1, \cdots u_{\frac{N}{2}-1}) \in C^{N/2}$$ ~S410

Change the order of values based on the bit-reversed index $$(\tilde{u}_0, \tilde{u}_1, \cdots \tilde{u}_{\frac{N}{2}-1}) \in C^{N/2}$$ ~S420

Make $m(x)$ where $m_i = \mathrm{Real}(u_i)$ and $m_{i+N/2} = \mathrm{Imag}(u_i)$ $$m(x) = m_0 + m_1 x + \cdots + m_N x^{N-1} \in R_{q0}$$ ~S430

Encrypt with Public Key$(b(x) \bmod q_0, a(x) \bmod q_0) \in R_{q0}^2$ $$(c_1(x), c_2(x)) = (v(x) \cdot b(x) + m(x) + e_1(x), v(x) \cdot a(x) + e_1(x)) \in R_{q0}^2$$ ~S440

$$\mathrm{Return}(c_1(x), c_2(x))$$ ~S450

END

FIG. 8

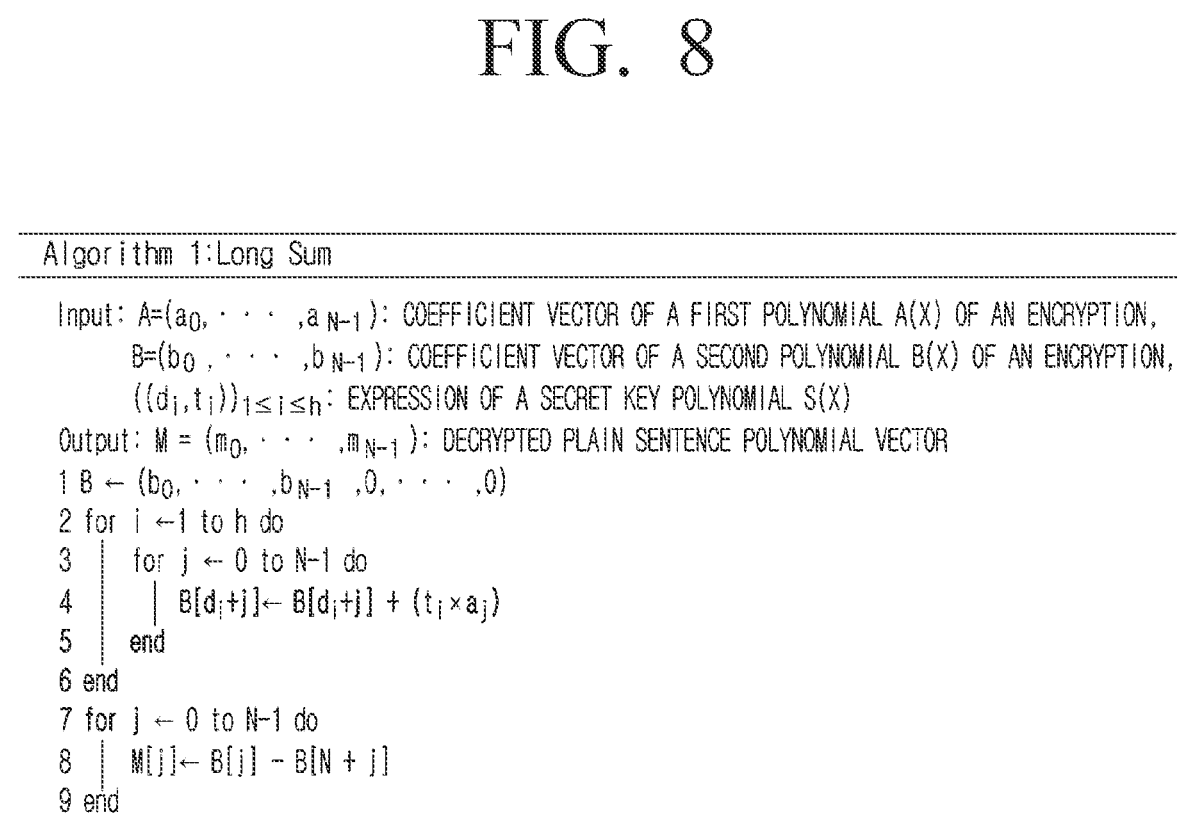

---
Algorithm 1:Long Sum

---

Input: $A=(a_0, \cdots, a_{N-1})$: COEFFICIENT VECTOR OF A FIRST POLYNOMIAL $A(X)$ OF AN ENCRYPTION,
$\quad B=(b_0, \cdots, b_{N-1})$: COEFFICIENT VECTOR OF A SECOND POLYNOMIAL $B(X)$ OF AN ENCRYPTION,
$\quad ((d_i, t_i))_{1 \le i \le h}$: EXPRESSION OF A SECRET KEY POLYNOMIAL $S(X)$
Output: $M = (m_0, \cdots, m_{N-1})$: DECRYPTED PLAIN SENTENCE POLYNOMIAL VECTOR
1 $B \leftarrow (b_0, \cdots, b_{N-1}, 0, \cdots, 0)$
2 for $i \leftarrow 1$ to $h$ do
3 $\quad$ for $j \leftarrow 0$ to $N-1$ do
4 $\quad \quad$ $B[d_i+j] \leftarrow B[d_i+j] + (t_i \times a_j)$
5 $\quad$ end
6 end
7 for $j \leftarrow 0$ to $N-1$ do
8 $\quad$ $M[j] \leftarrow B[j] - B[N + j]$
9 end

Figure 10:
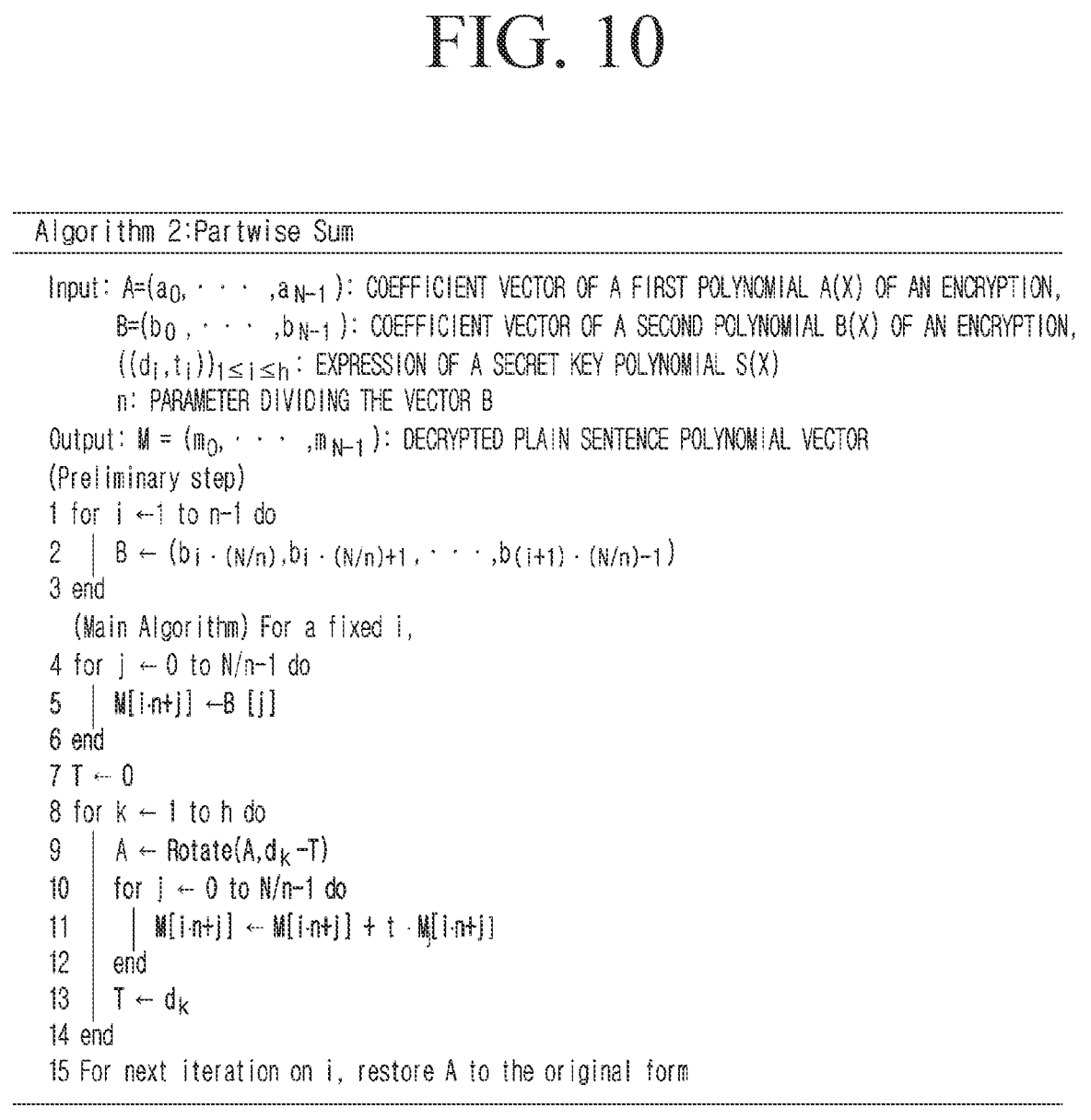

Algorithm 2:Partwise Sum

---

Input: $A=(a_0, \cdots, a_{N-1})$: COEFFICIENT VECTOR OF A FIRST POLYNOMIAL $A(X)$ OF AN ENCRYPTION,
　　　$B=(b_0, \cdots, b_{N-1})$: COEFFICIENT VECTOR OF A SECOND POLYNOMIAL $B(X)$ OF AN ENCRYPTION,
　　　$((d_i,t_i))_{1 \le i \le h}$: EXPRESSION OF A SECRET KEY POLYNOMIAL $S(X)$
　　　$n$: PARAMETER DIVIDING THE VECTOR B
Output: $M = (m_0, \cdots, m_{N-1})$: DECRYPTED PLAIN SENTENCE POLYNOMIAL VECTOR
(Preliminary step)
1 for $i \leftarrow 1$ to n-1 do
2　│　$B \leftarrow (b_{i \cdot (N/n)}, b_{i \cdot (N/n)+1}, \cdots, b_{(i+1) \cdot (N/n)-1})$
3 end
　　(Main Algorithm) For a fixed i,
4 for $j \leftarrow 0$ to N/n-1 do
5　│　$M[i \cdot n+j] \leftarrow B[j]$
6 end
7 $T \leftarrow 0$
8 for $k \leftarrow 1$ to h do
9　│　$A \leftarrow Rotate(A, d_k - T)$
10　│　for $j \leftarrow 0$ to N/n-1 do
11　│　│　$M[i \cdot n+j] \leftarrow M[i \cdot n+j] + t \cdot M[i \cdot n+j]$
12　│　end
13　│　$T \leftarrow d_k$
14 end
15 For next iteration on i, restore A to the original form

---

METHOD FOR HOMOMORPHIC ENCRYPTION OR DECRYPTION IN CONSIDERATION OF SPATIAL COMPLEXITY

CROSS REFERENCE TO RELATED APPLICATIONS

The present application is the U.S. national stage of International Application No. PCT/KR2021/008476 filed on Jul. 25, 2021.

TECHNICAL FIELD

The disclosure relates to a method for homomorphic encryption or decryption in consideration of spatial complexity, and more particularly, to a method for encryption or decryption which enables making an encryption or decryption with a small memory capacity.

DESCRIPTION OF THE RELATED ART

As communication technologies have developed, and distribution of electronic devices have become active, effort for maintaining communication security between electronic devices is being continuously made. Accordingly, in most communication environments, encryption/decryption technologies are being used.

When a message encrypted by an encryption technology is transferred to a counterpart, the counterpart should perform decryption for using the message. In this case, in the process wherein the counterpart decrypts the encrypted data, waste of resources and time occurs. Also, in case hacking by a third party is performed while the counterpart temporarily decrypted the message for an operation, there is a problem that the message can be easily leaked to the third party.

For resolving such a problem, a method for homomorphic encryption is being studied. According to homomorphic encryption, even if an operation is performed in an encryption itself without decrypting encrypted information, the same result as a value of performing an operation for a plain text and then encrypting the text can be obtained. Accordingly, various kinds of operations can be performed while an encryption is not decrypted.

Meanwhile, when decrypting an encryption, a decryption process is performed by using a secret key, and as a conventional decryption key is stored in a double CRT form, a storage space of $N \cdot \log q_0$ bits is needed. For example, if a general parameter that is currently used wherein $N=2^{17}$, $\log q_0=62$, and the number of decimals is 29 is used, the size of the decryption key has a capacity of about scores of MBs.

Also, in a decryption process, pre-calculation information for iCRT and iNTT calculations should be managed, and thus a very big memory space is required for decryption for a homomorphic encryption. Accordingly, a method for performing a decryption process even in a device having a low memory capacity is required.

In addition, in a process of rebooting or encoding for an encryption, an operation of converting a homomorphic encryption into a polynomial form is required, and in this process, a big memory capacity is needed. Accordingly, a method for performing rebooting or encoding even with a small memory capacity in such a conversion process is required.

DETAILED DESCRIPTION OF THE INVENTION

Technical Problem

The disclosure was devised for resolving the aforementioned problems, and the purpose of the disclosure is in providing a method for encryption or decryption which enables making an encryption or decryption with a small memory capacity.

Technical Solution

For achieving the aforementioned purpose, a method for processing a homomorphic encryption according to an embodiment of the disclosure includes the steps of receiving an input of a homomorphic encryption, and outputting an approximate message for the input homomorphic encryption by using information for a secret key, wherein the secret key is expressed as a polynomial having a plurality of terms, and the information for the secret key includes information on degrees and coefficients of the plurality of respective terms.

In this case, the secret key may include 64 terms, and the coefficient information may have a value of 1 or −1.

Meanwhile, the secret key may be a polynomial calculated by using only a last decimal $q_0$ from a predetermined ring.

Meanwhile, the step of outputting an approximate message may include the steps of performing inverse Number Theoretic Transformation (iNTT) processing on the homomorphic encryption, operating the iNTT-processed homomorphic encryption and the information for the secret key and calculating an approximate message in a polynomial form, and decoding the calculated approximate message in a polynomial form and calculating the approximate message.

In this case, in the step of calculating an approximate message in a polynomial form, an arrangement space of the iNTT-processed homomorphic encryption may be increased by two times, and coefficient information listed based on the degree information and the homomorphic encryption of which arrangement space was increased may be repetitively operated and the coefficient information may be shifted by stages from a low degree of the homomorphic encryption of which arrangement space was increased, and the approximate message in a polynomial form may be calculated.

Alternatively, in the step of calculating an approximate message in a polynomial form, the arrangement space of the iNTT-processed homomorphic encryption may be divided into a plurality of sections, and an operation between the iNTT-processed homomorphic encryption and the coefficient information listed based on the degree information may be performed for the plurality of respective sections, and the approximate message in a polynomial form may be calculated.

Meanwhile, a method for processing a homomorphic encryption according to another embodiment of the disclosure may include the steps of receiving a homomorphic encryption, converting the received homomorphic encryption into a polynomial, modulus-operating the converted polynomial, and converting the modulus-operated result into a homomorphic encryption. Also, in the step of converting into a polynomial, a plurality of slot values inside the received homomorphic encryption may be used as they are as a plurality of coefficient values of the polynomial.

In this case, in the step of converting into a homomorphic encryption, a homomorphic encryption having the plurality of coefficient values of the polynomial which is the modulus-operated result as a plurality of slot values may be output.

Meanwhile, in the step of converting into a polynomial, based on a ratio of an approximate message inside the homomorphic encryption exceeding a threshold value, the encryption may be converted into a polynomial.

Meanwhile, in the step of performing a modulus operation, a modulus value of the homomorphic encryption may be converted, and a modulus operation for the homomorphic encryption converted into a polynomial may be performed with the modulus value before conversion.

Meanwhile, a method for processing a homomorphic encryption according to another embodiment of the disclosure may include the steps of receiving an input of a message, converting the message into a polynomial, and generating a homomorphic encryption by using the message converted into a polynomial, a public key, and information for a public key encryption multiplier random polynomial, wherein the public key encryption multiplier random polynomial may be expressed as a polynomial having a plurality of terms, and the information for the public key encryption multiplier random polynomial may include information on degrees and coefficients of the plurality of respective terms.

In this case, in the step of converting into a polynomial, element values of the input message may be used as they are as a plurality of coefficient values of the polynomial.

In this case, based on the element values of the message not being integers, the values may be rounded off and the values may be converted into integers, and the values converted into integers may be used as the coefficient values of the polynomial.

Meanwhile, the public key may be calculated by using information for a secret key including the information on the degrees and the coefficients of the plurality of respective terms.

In this case, the secret key may include 64 terms, and the coefficient information may have a value of 1 or −1.

Meanwhile, in the step of generating a homomorphic encryption, a homomorphic encryption expressed as a polynomial calculated by using only a last decimal $q_0$ from a predetermined ring may be generated.

Meanwhile, an operation device according to an embodiment of the disclosure includes a memory storing at least one instruction, and a processor executing the at least one instruction, wherein the processor is configured to, by executing the at least one instruction, perform decryption for a homomorphic encryption by using information for a secret key, and the secret key is expressed as a polynomial having a plurality of terms, and the information for the secret key includes information on degrees and coefficients of the plurality of respective terms.

In this case, the secret key may include 64 terms, and the coefficient information may have a value of 1 or −1.

Meanwhile, the processor may convert a homomorphic encryption into a polynomial having a plurality of respective slot values inside the homomorphic encryption as coefficient values, modulus-operate the converted polynomial, and convert the modulus-operated result into a homomorphic encryption having the plurality of respective coefficient values of the modulus-operated polynomial as slot values.

Meanwhile, the processor may convert a message into a polynomial, and generate a homomorphic encryption by using the message converted into a polynomial, a public key, and information for a public key encryption multiplier random polynomial, wherein the public key encryption multiplier random polynomial may be expressed as a polynomial having a plurality of terms, and the information for the public key encryption multiplier random polynomial may include information on degrees and coefficients of the plurality of respective terms.

Effect of the Invention

According to the various embodiments of the disclosure as described above, it is possible to generate an encryption, or decrypt an encryption even in an environment having relatively small resources compared to a server such as a smartphone.

BRIEF DESCRIPTION OF THE DRAWINGS

FIG. 4 is a diagram for illustrating an encrypting operation according to an embodiment of the disclosure;

FIG. 8 is a diagram illustrating the operation algorithm in FIG. 7;

FIG. 10 is a diagram illustrating the operation algorithm in FIG. 9.

BEST MODE FOR IMPLEMENTING THE INVENTION

Mode for Implementing the Invention

Figure 1:
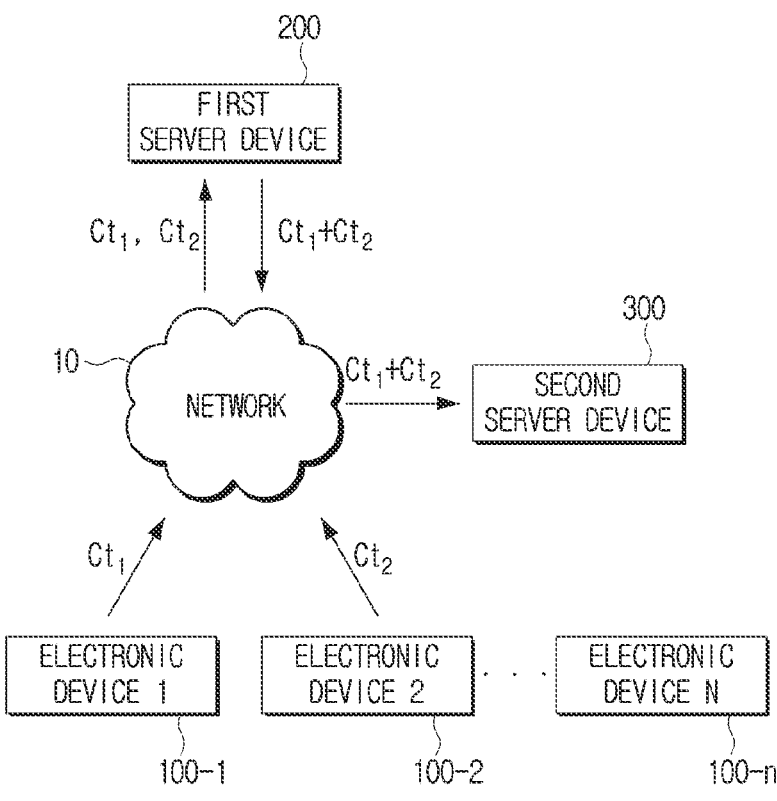
FIG. 1 is a diagram for illustrating a configuration of a network system according to an embodiment of the disclosure.

Hereinafter, the disclosure will be described in detail with reference to the accompanying drawings. Meanwhile, to an information (data) transmission process performed in the disclosure, encryption/decryption may be applied depending on needs, and all expressions describing an information (data) transmission process in the disclosure and the claims should be interpreted to include cases of performing encryption/decryption, even if there are no separate mentions in this regard. Also, in the disclosure, expression in forms such as "transfer (transmit) from A to B" or "A receives from B" also include a case wherein an object is transferred (transmitted) or received while another medium is included in between, and the expressions do not necessarily express only a case wherein an object is directly transferred (transmitted) or received from A to B.

In addition, in the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps. Further, the description "A or B" in this specification is defined to include not only a case wherein one of A or B is selectively referred to, but also a case wherein both of A and B are included. Also, the term "include" in this specification includes a case wherein elements other than elements listed as being included are further included.

Also, in the disclosure, only essential components necessary for description of the disclosure are explained, and components that are not related to the essence of the disclosure are not mentioned. In addition, the description of the disclosure should not be interpreted as exclusive meaning including only the components mentioned, but should be interpreted as non-exclusive meaning that other components may be included.

Further, in the disclosure, "a value" is defined as a concept including not only a scalar value, but also a vector.

Also, mathematical operations and calculations in each step of the disclosure described below may be implemented as computer operations by a coding method publicly known for performing the operations or the calculations and/or coding appropriately designed for the disclosure.

In addition, specific mathematical formulae described below are described as examples among several possible alternatives, and the scope of protection of the disclosure should not be interpreted to be limited to the mathematical formulae mentioned in the disclosure.

For the convenience of explanation, notations as follows are designated in the disclosure.

$a \leftarrow D$: select an element a according to a distribution D $s1, s2 \in R$: Each of S1 and S2 is an element belonging to an R set.

mod(q): a remaining operation with q as a law $\lfloor \cdot \rfloor$: an inside value is rounded off Hereinafter, various embodiments of the disclosure will be described in detail with reference to the accompanying drawings.

FIG. 1 is a diagram for illustrating a configuration of a network system according to an embodiment of the disclosure.

Referring to FIG. 1, a network system may include a plurality of electronic devices 100-1-100-$n$, a first server device 200, and a second server device 300, and each component may be connected with one another through a network 10.

The network 10 may be implemented as wired or wireless communication networks in various forms, e.g., a broadcasting communication network, an optical communication network, a cloud network, etc., and each device may be connected with one another by a method such as Wi-Fi, Bluetooth, Near Field Communication (NFC), etc. without a separate medium.

In FIG. 1, it is illustrated that there are a plurality of electronic devices 100-1-100-$n$, but a plurality of electronic devices do not necessarily have to be used, and one device may be used. As an example, the electronic devices 100-1-100-$n$ may be implemented as devices in various forms such as a smartphone, a tablet, a game player, a PC, a laptop PC, a home server, a kiosk, etc., and other than them, the electronic devices may be implemented in forms of home appliances to which an IoT function is applied.

A user may input various information through the electronic devices 100-1-100-$n$ that the user uses. Input information may be stored in the electronic devices 100-1-100-$n$ themselves, but the information may be transferred to an external device and stored for reasons of storage capacity and security, etc. In FIG. 1, the first server device 200 may perform a role of storing such information, and the second server device 300 may perform a role of using some or all of the information stored in the first server device 200.

Each electronic device 100-1-100-$n$ may homomorphically encrypt the input information, and transfer a homomorphic encryption to the first server device 200. Here, each electronic device 100-1-100-$n$ may generate a homomorphic encryption by converting the input information (i.e., a message) into a polynomial form (i.e., performing encoding), and encrypting the message converted into a polynomial form with a predetermined public key (or a secret key). Here, a public key may be generated by using a secret key. Also, a secret key may be expressed as a polynomial having a plurality of terms, and it may store information on degrees and coefficients of each of the plurality of terms. Specific encoding and encrypting operations will be described below with reference to FIG. 2 and FIG. 3.

Each electronic device 100-1-100-$n$ may include an encryption noise calculated in a process of performing homomorphic encryption, i.e., an error in an encryption. Specifically, a homomorphic encryption generated in each electronic device 100-1-100-$n$ may be generated in a form wherein a result value including a message and an error value is restored when it is decrypted by using a secret key later.

As an example, a homomorphic encryption generated in the electronic devices 100-1-100-$n$ may be generated in a form satisfying a property as follows when it is decrypted by using a secret key.

$$Dec(ct, sk) = \langle ct, sk \rangle = M + e \pmod q \qquad \text{[Formula 1]}$$

Here, ct means an encryption, sk means a secret key, Dec(ct, sk) means a decrypting operation for the encryption ct using the secret key sk, $\langle, \rangle$ means a usual inner product, M means a plain sentence message, e means an encryption error value, and mod q means a modulus of the encryption. Meanwhile, q should be selected to be bigger than M which is a result value wherein a scaling factor $\Delta$ is multiplied with a message. If an absolute value of the error value e is sufficiently small compared to M, a decryption value M+e of the encryption is a value that can replace an original message with the same precision in a significant number operation. In decrypted data, an error may be arranged on the side of the lowest bit (LSB), and M may be arranged on the side of the second lowest bit to be adjacent to the error.

In case the size of a message is too small or too big, the size may be adjusted by using a scaling factor. If a scaling factor is used, not only a message in an integer form but also a message in a real number form can be encrypted, and thus usability can be greatly increased. Also, by adjusting the size of a message by using a scaling factor, the size of an area wherein messages exist, i.e., a valid area can be adjusted in an encryption after an operation was performed.

Depending on embodiments, an encryption modulus q may be used while being set in various forms. As an example, a modulus of an encryption may be set in a form of $q = \Delta^L$ which is an exponentiation of the scaling factor $\Delta$. If $\Delta$ is 2, the modulus may be set as a value like $q = 2^{10}$.

The first server device 200 may not decrypt a received homomorphic encryption, but store it in a state of an encryption.

The second server device 300 may request a result of specific processing for a homomorphic encryption to the first server device 200. The first server device 200 may perform a specific operation according to the request of the second server device 300, and then transfer the result to the second server device 300.

As an example, in case encryptions ct1 and ct2 transferred from two electronic devices 100-1, 100-2 are stored in the first server device 200, the second server device 300 may request a value of summing up the information provided from the two electronic devices 100-1, 100-2 to the first server device 200. The first server device 200 may perform an operation of summing up the two encryptions according to the request, and transfer the result value (ct1+ct2) to the second server device 300.

By virtue of the property of a homomorphic encryption, the first server device 200 may perform an operation in a state of not performing decryption, and a result value thereof also becomes a form of an encryption. In the disclosure, a result value obtained by an operation is referred to as an operation result encryption.

Then, the first server device 200 may transfer the operation result encryption to the second server device 300.

The second server device 300 may decrypt the received operation result encryption, and obtain an operation result value of data included in each homomorphic encryption. For example, the second server device 300 may decrypt the received operation result encryption and generate an approximate message having a value in a polynomial form (i.e., perform decryption), and decode the generated approximate message in a polynomial form and generate an approximate message. Specific decrypting and decoding operations will be described below with reference to FIG. 2 and FIG. 3.

The first server device 200 may perform an operation several times according to a user request. In this case, a ratio of an approximate message inside an operation result encryption that is obtained for every operation may vary. If a ratio of an approximate message exceeds a threshold value, the first server device 200 may perform a rebooting (bootstrapping) operation. As described above, the first server device 200 may perform an operation action, and thus it may also be referred to as an operation device.

Specifically, in the aforementioned formula 1, if q is smaller than M, M+e(mod q) has a different value from M+e, and thus decryption becomes impossible. Accordingly, a q value should always be maintained to be bigger than M. However, as an operation proceeds, a q value gradually decreases. Accordingly, an operation of changing a q value to be always bigger than M is needed, and such an operation is called a rebooting operation. As such a rebooting operation is performed, an encryption can become a state of being operable again. A specific rebooting operation will be described below with reference to FIG. 6.

Meanwhile, in FIG. 1, a case wherein encryption is performed in the first electronic device and the second electronic device, and the second server device performs decryption is illustrated, but the disclosure is not necessarily limited thereto.

Figure 2:
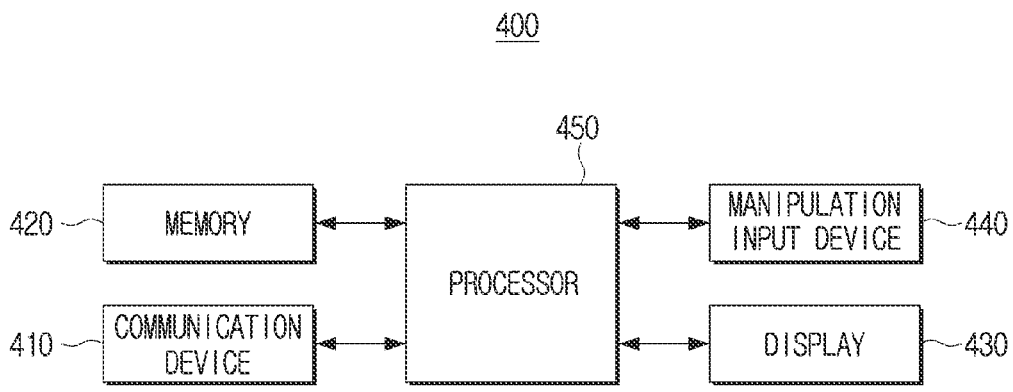
FIG. 2 is a block diagram illustrating a configuration of an operation device according to an embodiment of the disclosure.

FIG. 2 is a block diagram illustrating a configuration of an operation device according to an embodiment of the disclosure.

Specifically, in the system in FIG. 1, devices performing homomorphic encryption such as the first electronic device and the second electronic device, a device operating a homomorphic encryption such as the first server device, and a device decrypting a homomorphic encryption such as the second server device, etc. may be referred to as operation devices. Such operation devices may be various devices like a personal computer (PC), a laptop computer, a smartphone, a tablet, a server, etc.

Referring to FIG. 2, an operation device 400 may include a communication device 410, a memory 420, a display 430, a manipulation input device 440, and a processor 450.

The communication device 410 is formed to connect the operation device 400 with an external device (not shown), and it may not only be in a form of being connected to an external device through a near field communication network (a local area network: a LAN) and an Internet network, but also be in a form of being connected through a universal serial bus (USB) port or a wireless communication (e.g., WiFi 802.11a/b/g/n, NFC, Bluetooth) port. Such a communication device 410 may also be referred to as a transceiver.

The communication device 410 may receive a public key from an external device, and transfer a public key generated by the operation device 400 itself to the external device. Here, the public key may have been calculated by using information for a secret key including the information on the degrees and the coefficients of the plurality of respective terms.

Also, the communication device 410 may receive a message from an external device, and send a generated homomorphic encryption to the external device.

In addition, the communication device 410 may receive various kinds of parameters necessary for generating an encryption from an external device. Meanwhile, in actual implementation, various kinds of parameters may be directly input from a user through the manipulation input device 440 that will be described below.

Further, the communication device 410 may be requested an operation for a homomorphic encryption from an external device, and transfer a calculated result in accordance thereto to the external device.

Also, the communication device 410 may receive a homomorphic encryption.

The memory 420 is a component for storing an O/S or various kinds of software, data, etc. for operating the operation device 400. The memory 420 may be implemented in various forms such as a RAM or a ROM, a flash memory, an HDD, an external memory, a memory card, etc., and it is not limited to any one.

The memory 420 may store a message to be encrypted. Here, a message may be various kinds of credit information, personal information, etc. that a user authenticated, and it may also be information related to a use history such as location information, information on the Internet use time, etc. used in the operation device 400.

Also, the memory 420 may store a public key, and in case the operation device 400 is the device that directly generated the public key, the memory 420 may store not only a secret key, but also various kinds of parameters, a polynomial distribution value, etc. necessary for generating a public key and a secret key.

Here, the memory 420 may store a secret key in a form of a double Chinese Remainder Theorem (CRT), or store it in a form of information for a secret key according to the disclosure. Here, the form of information for a secret key stores degrees and coefficients of each term having a value inside a polynomial as information on order pairs (e.g., $(d_1, t_1), \ldots, (d_h, t_h)$). If a secret key is constituted only with terms of a predetermined number (e.g., $64=2^6$), and $N=2^{17}$, information on a secret key has just a size of about 144 byte.

Also, for a public key encryption multiplier random polynomial $v(x)$, a secret key may be stored in a form of a double CRT, or information on degrees and coefficients of each term constituting a polynomial may be stored in a form of order pairs. Here, a public key encryption multiplier random polynomial will be described later regarding an operation of generating an encryption.

In addition, the memory 420 may store a homomorphic encryption generated in a process that will be described below. Also, the memory 420 may store intermediate data (e.g., a message vector, a message in a polynomial form, etc.) in a process of generating a homomorphic encryption.

Further, the memory 420 may store a homomorphic encryption transferred from an external device. Also, the memory 420 may store an operation result encryption in an operation process that will be described below.

In addition, the memory 420 may store an approximate message which is a result value of decryption for a homomorphic encryption. Also, the memory 420 may store intermediate data (e.g., an approximate message in a vector form, a message in a polynomial form, etc.) in a process of decrypting a homomorphic encryption.

The display 430 may display a user interface window for receiving selection of functions supported by the operation device 400. For example, the display 430 may display a user interface window for receiving selection of various kinds of functions provided by the operation device 400. Such a display 430 may be a monitor such as a liquid crystal display (LCD), organic light emitting diodes (OLED), etc., and it may also be implemented as a touch screen that can simultaneously perform the function of the manipulation input device 440 that will be described below.

The display 430 may display a message requesting input of a parameter necessary for generating a secret key and a public key. Also, the display 430 may display a user interface (UI) wherein selection of a message for a subject to be encrypted is requested. Meanwhile, in actual implementation, a subject to be encrypted may be directly selected by a user, or it may be automatically selected. That is, personal information for which encryption is needed, etc. may be automatically set even if a user does not directly select a message.

The manipulation input device 440 may receive selection of a function of the operation device 400 and input of a control command for the function from a user. For example, the manipulation input device 440 may receive input of a parameter necessary for generating a secret key and a public key from a user. Also, the manipulation input device 440 may receive setting of a message to be encrypted from a user.

The processor 450 controls each component inside the operation device 400. Such a processor 450 may consist of a single device such as a central processing unit (CPU), an application-specific integrated circuit (ASIC), etc., and it may also consist of a plurality of devices such as a CPU, a graphics processing unit (GPU), etc.

When a message to be transferred is input, the processor 450 stores it in the memory 420. The processor 450 may homomorphically encrypt the message by using various kinds of setting values and programs stored in the memory 420. In this case, a public key may be used.

The processor 450 may generate a public key necessary for performing encryption by itself and use it, or receive a public key from an external device and use it. As an example, the second server device 300 performing decryption may distribute public keys to other devices.

In the case of generating a key by itself, the processor 450 may generate a public key by using a Ring-LWE technic. Describing in detail, the processor 450 may first set various kinds of parameters and rings, and store them in the memory 420. As examples of parameters, there may be the length of a plain sentence message bit, the sizes of a public key and a secret key, etc.

In mathematics, a ring refers to a set wherein an addition operation and a multiplication operation are given, and which is closed for each of the addition and the multiplication, and wherein an appropriate algebraic relation between the two operations is satisfied. A ring may also be referred to as 'hwan.'

In the disclosure, a ring given as [Formula 2] below is used. This ring may be thought of as consisting of N−1 degree polynomials of which coefficient is Zq. In [Formula 2], ($\Phi_{2N}(x)$) located in the part of the "denominator" means an ideal made from a 2N degree cyclotomic polynomial $\Phi_{2N}(x)$, and this means that, in case $x^N$ is derived in a multiplication process of elements of a ring, this will be substituted to −1.

$$R = Z_q[x]/(\Phi_{2N}(x)) \qquad \text{[Formula 2]}$$

Meanwhile, the ring in the aforementioned formula 2 may have a complex number in a plain sentence space. Meanwhile, for improving an operation speed for a homomorphic encryption, only sets wherein a plain sentence space is a real number may be used among the aforementioned sets of rings.

When a ring is set, the processor 450 may calculate a secret key sk from the ring.

$$sk = (1, s(x)) \qquad \text{[Formula 3]}$$

Here, s(x) means a polynomial randomly generated with a small coefficient, and the maximum number of $s_i$ wherein $s(x) \leftarrow s_0 + s_1 X + \ldots + s_{N-1} X^{N-1}$, $s_i \in \{-1, 0, 1\}$, and $s_i \neq 0$ may be h. A specific calculation method of s(x) will be described below regarding FIG. 3. Then, the processor 450 may calculate a first random polynomial a(x) from the ring. The first random polynomial may be expressed as follows.

$$a(x) \leftarrow R \qquad \text{[Formula 4]}$$

Also, the processor 450 may calculate an error. Specifically, the processor 450 may extract an error from a discrete Gaussian distribution or a distribution of which statistical distance is close to it. Such an error may be expressed as follows.

$$e(x) \leftarrow D_{\alpha q}^n \qquad \text{[Formula 5]}$$

When an error is calculated, the processor 450 may perform a modular operation of the error to the first random polynomial and the secret key and calculate a second random polynomial. The second random polynomial may be expressed as follows.

$$b(x) = -a(x)s(x) + e(x)(\text{mod } q) \qquad \text{[Formula 6]}$$

Ultimately, the public key pk is a form of including the first random polynomial and the second random polynomial, and it is set as follows.

$$pk = (b(x), a(x)) \qquad \text{[Formula 7]}$$

As the aforementioned method for generating keys is merely an example, and thus the disclosure is not necessarily limited thereto, and a public key and a secret key can obviously be generated by methods other than this.

Meanwhile, when a public key is generated, the processor 450 may control the communication device 410 such that the key is transferred to other devices.

Then, the processor 450 may generate a homomorphic encryption for a message. Here, the processor 450 may perform an encoding operation of precedingly converting a message into a polynomial. Here, the processor 450 may perform encoding of converting a message into a polynomial form by using a canonical embedding function. Meanwhile, for the aforementioned encoding operation, a method of using slot values as they are as coefficient values of a polynomial but not a calculation process may be used. Such a method will be described below with reference to FIG. 5.

Then, the processor 450 may generate an encryption for the message converted into a polynomial form by using formula 8 as follows.

$$ct(x) = (v(x) \cdot b(x) + \Delta \cdot M + e_0(x), v(x) \cdot a(x) + e_1(x)) \in R \times R \quad \text{[Formula 8]}$$

Here, v(x) is a public key encryption multiplier random polynomial, b(x) is the second random polynomial, $\Delta$ is a scale factor, M is a message, e0(x) and e1(x) are errors in polynomial forms, and a(x) is the first random polynomial. The aforementioned v(x) is a polynomial having a plurality of terms, and information on degrees and coefficients of the plurality of respective terms may be expressed in a form of order pairs.

Here, the processor 450 may generate the length of the encryption to correspond to the size of the scaling factor.

A message to be encrypted may be received from an external source, or it may be input from an input device directly provided in or connected to a terminal device 100. Also, the scaling factor may be directly input by a user, or it may be provided through another device. For example, in case the terminal device 100 includes a touch screen or a keypad, the processor 450 may store data input by a user through a touch screen or a keypad in the memory 420, and then encrypt the data.

A generated homomorphic encryption may be in a form that is restored to a result value of adding an error to a value that reflected the scaling factor to the message when it is decrypted. For the scaling factor, a value that was previously input and set may be used as it is.

Meanwhile, according to an embodiment of the disclosure, packing may be performed. If packing is used in homomorphic encryption, it becomes possible to encrypt a plurality of messages into one encryption. In this case, if operations among encryptions are performed in the operation device 400, operations for a plurality of messages are ultimately processed in parallel, and thus burden of operations becomes greatly reduced.

Then, when a homomorphic encryption is generated, the processor 450 may store the encryption in the memory 420, or control the communication device 410 to transfer the homomorphic encryption to another device according to a user request or a predetermined default command.

Further, in case decryption for the homomorphic encryption is needed, the processor 450 may apply the secret key to the homomorphic encryption and generate a decryption in a polynomial form, and decode the decryption in a polynomial form and generate an approximate message. Here, the generated approximate message may be in a form wherein an error is added to the initial message, as mentioned in the formula 1 described earlier. A specific decryption process and a specific decoding operation will be described below with reference to FIG. 3.

In addition, the processor 450 may perform operations for encryptions. Specifically, for homomorphic encryptions, the processor 450 may perform operations such as an addition or a multiplication, etc. while an encrypted state is maintained. Specifically, the processor 450 may perform first function processing for each of homomorphic encryptions to be used for operations, perform operations such as an addition or a multiplication, etc. among the homomorphic encryptions for which the first function processing was performed, and perform second function processing which is an inverse function of the first function for the homomorphic encryptions for which operations were performed. For the first function processing and the second function processing as above, a linear conversion technology in a rebooting process that will be described below may be used. Alternatively, for the aforementioned function processing, a method of using slot values of an encryption as they are as coefficient values of a polynomial, or a method of using coefficient values of a polynomial as they are as slot values, but not a calculation process, may be used.

Meanwhile, when an operation is completed, the operation device 400 may detect data of a valid area from the operation result data. Specifically, the operation device 400 may perform rounding processing for the operation result data, and detect data of a valid area. Rounding processing means proceeding with a round-off of a message in an encrypted state, and alternatively, it may also be referred to as rescaling. Specifically, the operation device 400 multiplies $\Delta^{-1}$ which is a reciprocal number of a scaling factor to components of each encryption, and rounds off the result value, and thereby removes a noise area. A noise area may be determined to correspond to the size of the scaling factor. Ultimately, a message of a valid area excluding the noise area may be detected. As this process proceeds in an encrypted state, an additional error occurs, but the size of the error is sufficiently small, and thus it can be ignored.

Also, if a ratio of an approximate message inside an encryption exceeds a threshold value as a result of an operation, the operation device 400 may perform a rebooting operation for the encryption.

As described above, an operation device according to the disclosure can express a secret key in a very small size, and thus a storage space for a secret key can be reduced. Also, when performing an encryption, it is also possible to express a public key encryption multiplier random polynomial in a very small size, and thus an encrypting operation can be performed with a small storage space.

Meanwhile, in illustrating and describing FIG. 1 and FIG. 2, it was illustrated and described that encrypting operations, i.e., both of encoding and encrypting operations arc performed in one device, but in actual implementation, encryption may be performed as an encoding operation alone is performed in one device, and the encoding result is received at another device. Also, in a decryption process, both of a decrypting operation and a decoding operation may be performed in one device, or a decrypting operation and a decoding operation may be separately performed in two devices.

Also, in illustrating and describing FIG. 1 and FIG. 2, it was described that an asymmetrical encryption method (i.e., a secret key and a public key) is used, but in actual implementation, encrypting and decrypting operations may be performed in a symmetrical encryption method.

Figure 3:
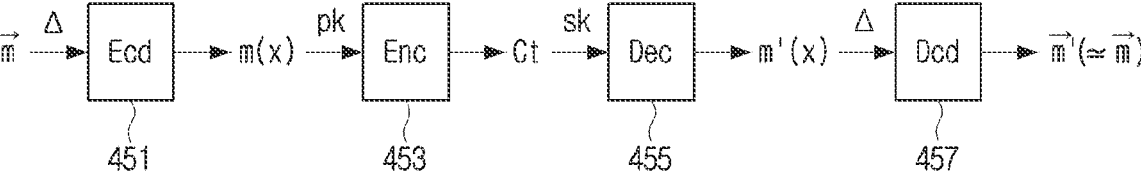
FIG. 3 is a diagram for illustrating generating and decrypting operations of an approximate homomorphic encryption.

FIG. 3 is a diagram for illustrating generating and decrypting operations of an approximate homomorphic encryption.

Referring to FIG. 3, the processor 450 may include an encoding module 451 (Ecd), an encryption module 453 (Enc), a decryption module 455 (Dec), and a decoding module 457 (Dcd).

For a homomorphic encryption generated in the disclosure, the four fundamental arithmetic operations of an addition, a subtraction, a multiplication, and a division are possible in an encrypted state. Such a homomorphic encryption has an advantage that it can be operated in an encrypted state, but the speed is slower than operating a plain sentence.

For overcoming a slow operation speed, data is stored in a form of a Full Residue Number System (FRNS), and hereinafter, encrypting and decrypting operations using the FRNS will be described.

The FRNS method is a method that can speed up various kinds of operations including multiplications by using a Chinese Remainder Theorem (CRT) and a Number Theoretic Transformation (NTT). Among them, the CRT is a method of changing a big number into a plurality of small numbers, and changing a plurality of small numbers into a big number on the other way around, and storing them, and the CRT satisfies the formula 9 as follows, and the numbers can be mutually restored as they correspond to each other in a one-to-one relation.

$$Z_q \rightarrow \prod_i Z_{qi}$$ [Formula 9]

$$x \mapsto (x \bmod q_0, \cdots, x \bmod q_m)$$

Here, $Q = \Pi_i q_i$.

If the above content is applied to coefficients of a polynomial, it is possible to extend a polynomial space as in the formula 10 below.

$$R_q \rightarrow \prod_i R_{qi}$$ [Formula 10]

$$a(x) \rightarrow (a(x) \bmod q_0, \cdots, a(x) \bmod q_m)$$

Here, $R_p = \{\Sigma_i a_i \cdot x^i | a_i \in Z_p\}$, and f(x) mod $q = \Sigma_i(a_i \bmod q) \cdot x^i$.

Encryption by such an FRNS method may be largely divided into a task of converting a message into a plain sentence space (i.e., an encoding operation) and a task of generating an encryption (i.e., an encrypting operation).

When a message is input, the encoding module 451 may convert the received message into a polynomial form and output it. For example, when there is a message m in a vector type of a complex number, the encoding module 451 may convert the message into an m(x) of a plain sentence space through a specific function. Here, outputting a message in a polynomial form may mean outputting a message in a double CRT representation.

Also, a specific function is a function that can correspond to a plain sentence space of a polynomial space in an N/2 degree message vector in a form of a complex number. Meanwhile, in actual implementation, the aforementioned specific function may not be used, but a value of a message (an element value) may be used as it is as a coefficient of a polynomial. Description in this regard will be made below with reference to FIG. 4.

If a scaling factor for a message is input, the encoding module 451 may output a polynomial like the formula 11 below.

$$m(x) = \tau^{-1}\left(\lfloor \Delta \cdot \vec{m} \rfloor_{\tau(R')}\right) \in R'$$ [Formula 11]

Here, $\vec{m}(m_j)_{0 \le j < n/2} \in R^{n/2}$, and it may be a message in a vector form. Also, m(x) is a message in a polynomial form, and it is, for example, an integer in a form of $(X) = m_0 + m_1 X + \ldots + m_{N-1} X^{N-1}$, and wherein $m_i \in [0, q-1]$. Such values may be expressed as vectors of coefficients $m_0, m_1, \ldots, m_{N-1}$.

Meanwhile, in the above description, only one message was converted into one polynomial, but in actual implementation, a plurality of messages may be converted into one polynomial. Such an operation may be referred to as packing.

If packing is used in homomorphic encryption, it becomes possible to encrypt a plurality of messages into one encryption. In this case, if operations among respective encryptions are performed in the operation device 400, operations for a plurality of messages are ultimately processed in parallel, and thus burden of operations becomes greatly reduced.

For example, in case a message consists of a plurality of message vectors, the encoding module 451 may convert the message into a polynomial in a form that can encrypt the plurality of message vectors in parallel, and then perform homomorphic encryption.

Then, the encryption module 453 may receive the message in a polynomial form, and reflect public keys to the received message, and generate a homomorphic encryption. For example, when public keys a(x), b(x) are given, the encryption module 453 may calculate as in the formula 12 below by using a polynomial m(x), and generate an encryption ct(x).

$$v(x) \leftarrow SampleZO(\rho)$$ [Formula 12]

$$ct(x) = (c_1(x) \cdot c_2(x)) \leftarrow v(x) \cdot (a(x), b(x)) + (e_1(x), m(x) + e_2(x))$$

Here, v(x) is a public key encryption multiplier random polynomial, and it may be expressed in a double CRT format, or it may be expressed as order pairs of degrees and coefficients corresponding to the number of the terms. Meanwhile, SampleZO(φ) is distribution of polynomials which are made as coefficients are selected as 0 with the probability of 1−ρ and selected as 1 or −1 with the probability of ρ/2, respectively. Also, ct(x) is an encryption in a polynomial form, a(x) is the first random polynomial, b(x) is the second random polynomial, and $e_1(x), e_2(x)$ are errors in polynomial forms.

Meanwhile, a decrypting operation for a homomorphic encryption may also be divided into two parts, and one is a task of obtaining a message polynomial and the other is a task of converting into a message. First, the operation of obtaining a message polynomial will be described by using the decryption module 455.

The decryption module 455 may receive input of an encryption and a secret key, and decrypt the encryption and output a message in a polynomial form (hereinafter, referred to as an approximate message) including an error. Specifically, when input encryptions $c_1(x)$, $c_2(x)$ are given, the decryption module 455 may obtain a message polynomial $m(x)$ through $c_2(x)+c_2(x) \cdot s(x)$.

Here, $s(x)$ is a secret key, and it may be sampled by using a Hamming weight. For example, the secret kay may be generated by a method as in the formula 13 below, and 1 or $-1$ in a number of h may be sampled and substituted to any coefficients, and the remaining coefficients may be set as 0.

$$s(x) \leftarrow HammingWeight(h) \qquad \text{[Formula 13]}$$

$$s(x) = \sum_{i=0}^{N-1} s_i \cdot x^i \xrightarrow{CRT} \left( \sum_{i=0}^{N-1} (s_i \bmod q_i) \cdot x^i \right)_{0 \leq j \leq nbr \ of \ prime}$$

As described above, if a secret key is not expressed as a double CRT, but stored using only the values and the locations of the coefficients for each term, only $h \cdot (1+\log N)$ bits are needed. To express correctly, $s(x)$ may be expressed as order pairs in a number of h, $(d_1, t_1), \ldots, (d_h, t_h)$, and the degree $d_i$ is made to satisfy $d_1 < d_2 < \ldots < d_h$. Also, $s(x)$ may be restored to $$s(x) = \sum_{i=0}^{h} t_i \cdot x^{d_i}.$$

For expressing $d_i$, $\log N$ bits are needed, and for expressing $t_i$, 1 bit is needed. In general, h is used as about $2^6$, and N is used as about $2^{17}$. Thus, in the conventional technology, a space of scores of MBs is needed, but in the case of expressing a secret key by the improved method, only a space of about 144 bytes is needed.

Meanwhile, a message output from the decryption module 455 is a message in a polynomial form, and thus a message may ultimately be output at the decoding module 457 based on a message output from the decryption module 455 and a scaling factor. For example, m may be restored in $m(x)$ by using an inverse function corresponding to a specific function used in an encoding process.

In the case of performing encryption or decryption for a homomorphic encryption by using the FRNS method as described above, it is possible to perform an operation and parallel processing in a small modulus space, and thus a faster operation than in the conventional technology is possible.

However, as the size of an encryption and the size of a secret key used in decryption are dependent on the number of prime numbers (nbr_of_prime) used, and thus a minimum storage space of Nxnbr_of_primex64 bits is required. Here, 64 is the size of a double-word variable used in software implementation.

In other words, it means that, when performing encryption or decryption, a storage space and a memory space in corresponding sizes are needed, and in an environment such as a PC, encryption or decryption is possible, but in a device having a limited storage space and a limited memory such as a mobile phone, it is difficult to perform encryption or decryption by the FRNS method.

Accordingly, hereinafter, a method for performing encryption by using a small memory will be described regarding FIG. 4, and a method for performing decryption will be described with reference to FIG. 5.

Meanwhile, in the illustrated embodiment, it was illustrated and described that the processor 450 includes all of four modules, but in actual implementation, only an encoding module and an encryption module may be included, or only a decryption module and a decoding module may be included. Also, in actual implementation, any one module alone among four modules may be included.

FIG. 4 is a diagram for illustrating an encrypting operation according to an embodiment of the disclosure.

Referring to FIG. 4, first, a message is input in operation S410. Here, the message may be a message in a vector type of a complex number.

Then, the message may be converted into a polynomial. Specifically, first, the input message $u_0$, $u_1$, $\ldots$, $u_{N/2-1}$ may be arranged in a bit-reversed order in operation S420. This process is similar to a process performed in a Cooley-Tukey FFT process. That is, if the result is indicated as $$\left( \tilde{u}_0, \tilde{u}_1, \cdots, \tilde{u}_{\frac{N}{2}-1} \right),$$

the process may correspond to $$\tilde{u}_0 = u_0, \tilde{u}_1 = u_{N/4}, \tilde{u}_2 = u_{N/8}, \tilde{u}_3 = u_{3N/4}, \cdots, \tilde{u}_{\frac{N}{2}-1} = u_{\frac{N}{2}-1}.$$

Then, a polynomial may be generated with the elements of the aligned message in operation S430. For example, the message may be converted into a polynomial by utilizing the values of the message in a vetor type of a complex number as they are as polynomial coefficients of $m(x)$. Here, as the message is a complex number, and the coefficients of the polynomial are integers, $\alpha_j$ and $\beta_j$ may be rounded off in the value of the message $m_j = \alpha_j + \beta_j \cdot i$, and substituted to the polynomial coefficients.

Meanwhile, in the conventional FRNS method, prime numbers in a number of L were used, and a plain sentence polynomial that existed in a plain sentence space of a big modulus value was divided and stored, but in the method according to the disclosure, a plain sentence polynomial may be converted by using only one prime number.

Such a method suggested above may be expressed as making an encryption in the lowest level compared to the conventional encryption method which makes an encryption in the highest level. Here, a level means a multiplicative circuit depth that can be additionally performed without a rebooting operation by using an encryption made, and it may be thought of as the number of times of the remaining multiplications that can be repetitively performed.

In addition to this, if an encryption is made in the lowest level, a rebooting operation should be performed for later operations, and a process that needs to be performed in this rebooting operation may be performed in advance by using a plain sentence, and a rebooting cost can thereby be reduced drastically.

Then, a homomorphic encryption may be generated by using a public key and information on a public key encryption multiplier random polynomial to the message converted into a polynomial in operation S440. For example, an encryption may be generated by using the aforementioned formula 12.

The encryption method as above according to an embodiment of the disclosure converts a plain sentence polynomial into a polynomial by using only one prime number, and uses information on a public key encryption multiplier random polynomial $v(x)$ having a small storage space, and thus the amount of the memory is reduced. Also, when converting from a message into a plain sentence space, a function is not used, but the value of the message is used as it is as a coefficient of a polynomial, and thus encoding time can be reduced greatly.

Also, as an encryption is stored in an FRNS form by using only one prime number, the size of an encryption may be reduced in a ratio of $|q_0|/|Q|$. Specifically, the size of an encryption may be reduced from $2 \cdot N \cdot \log Q$ bits to $2 \cdot N \cdot \log q_0$ bits, and for example, in case the size of an encryption is about 58 MB in a general method (in case $N=2^{17}$, log $Q=1506$, and log $q_0=62$), an encryption according to the disclosure is reduced to a size about 2 MB.

Figure 5:
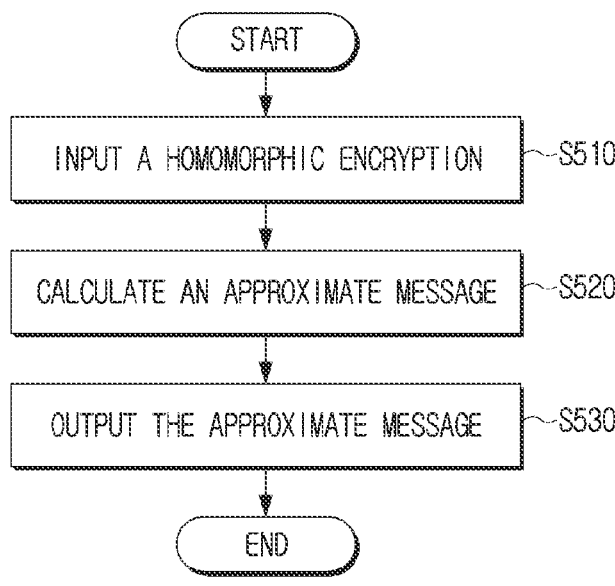
FIG. 5. is a diagram for illustrating a decrypting operation according to an embodiment of the disclosure.

FIG. 5 is a diagram for illustrating a decrypting operation according to an embodiment of the disclosure.

Referring to FIG. 5, a homomorphic encryption may be input in operation S610. Here, the input homomorphic encryption may be expressed as a double CRT form such as $(c_1(x), c_2(x))$.

Then, an approximate message for the input homomorphic encryption may be output by using information on a secret key. Specifically, in case a secret key is expressed as order pairs consisting of information on degrees and coefficients of a plurality of respective terms, the homomorphic encryption may be inverse Number Theoretic Transformation (INTT)-processed. Specifically, information on a secret key according to the disclosure is not a double CRT form, but a homomorphic encryption is a double CRT form, and thus iNTT processing may be performed on a homomorphic encryption for an operation between a secret key and a homomorphic encryption.

Here, iNTT is an inverse function of Number Theoretic Transformation (NTT), and NTT is a function that has $s(\omega_0)$, $s(\omega_1), \ldots, s(\omega_{N-1}) \in Z_{q_0}^N$ which is a result of substiting N degree roots in a number of N $\omega_0, \omega_1, \ldots, \omega_{N-1}$ to $s(x)$ in $Z_{q_0}$, as a decryption key.

Then, the iNTT-processed homomorphic encryption and the information on the secret key may be operated, and an approximate message in a polynomial form may be output. For example, in case a homomorphic encryption was generated by a method as in FIG. 4, the homomorphic encryption may be in a form of $(a(x), b(x)) \in R^2 q_0$, and each polynomial may be expressed as a vector of a coefficient.

For example, the encryption may be expressed as $a(x)= a_0+a_1 \cdot x+ \ldots +a_{N-1} \cdot x^{N-1}$, and stored in a form of $(a_0, a_1, \ldots, a_{N-1})$. In case the encryption and the decryption key (i.e., the secret key) are expressed with coefficients as above, for a polynomial operation $b(x)+a(x) \cdot s(x)$ when performing decryption, one time of a polynomial multiplication and one time of an addition are needed. Meanwhile, as a coefficient of the secret key $s(x)$ is one of $-1$, $0$, or $1$, a polynomial multiplication can be performed very effectively. Explanation in this regard will be made below with reference to FIG. 7 to FIG. 10.

Then, the calculated polynomial may be decoded and an approximate message may be calculated in operation S530. Meanwhile, in case element values of a message were used as they are as coefficients of a polynomial in encoding as described in FIG. 4, a decoding operation may not be a calculating operation, but it may generate an approximate message having coefficient values of a message polynomial $m(x)$ as element values.

Then, the calculated approximate message m may be output in operation S540.

A decryption method according to an embodiment of the disclosure as above does not use a secret key in a double CRT form, but uses information on order pairs for degrees and coefficients of terms (i.e., information on a secret key), and thus storage capacity of information necessary for decryption can be reduced. Also, as a polynomial multiplication is performed by using the fact that a coefficient of such a secret key has a value of $-1$, $0$, or $1$, a more effective operation is possible.

Figure 6:
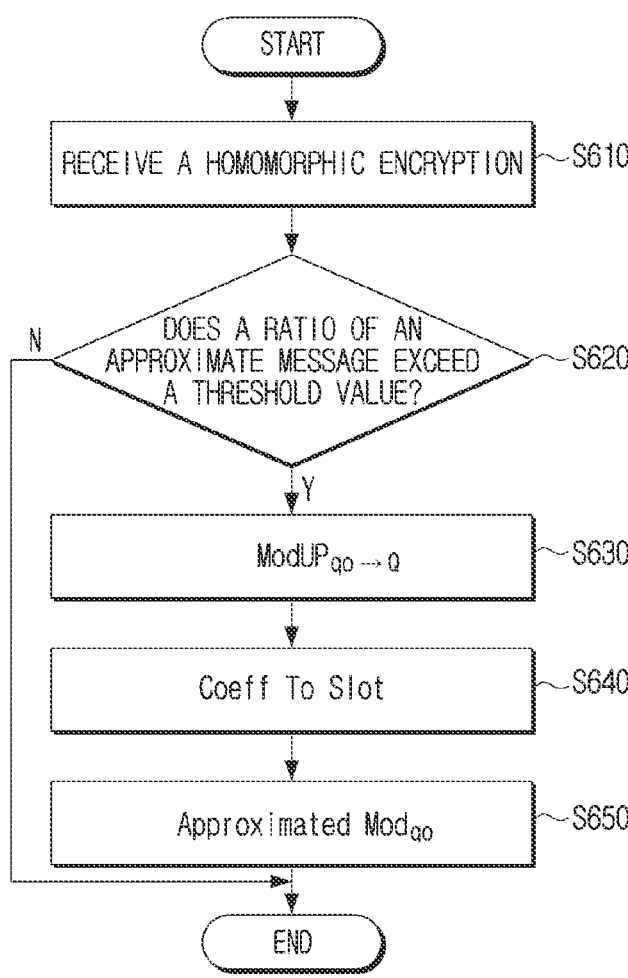
FIG. 6 is a diagram for illustrating a rebooting operation according to an embodiment of the disclosure.

FIG. 6 is a diagram for illustrating a rebooting operation according to an embodiment of the disclosure.

Referring to FIG. 6, first, a homomorphic encryption is received in operation S610.

Then, it is determined whether a ratio of an approximate message in the homomorphic encryption exceeds a threshold value in operation S620. Specifically, it may be determined whether a ratio of an approximate message in the homomorphic encryption exceeds a threshold value before an operation or after an operation for the homomorphic encryption.

If the ratio exceeds the threshold value, a rebooting operation may be performed. Specifically, the received homomorphic encryption may be converted into a polynomial. For example, a plurality of slot values inside the received homomorphic encryption may be used as a plurality of coefficient values of a polynomial. Here, if the slot values are not integer values, they may be rounded off and converted into integer values, and used as coefficient values. Meanwhile, in case the encryption is an encryption that was encrypted without using iFFT, the aforementioned step of converting into a polynomial may be omitted.

Then, the converted polynomial may be modulus-operated in operation S630. Specifically, a modulus value of the homomorphic encryption may be converted ($q \rightarrow Q$).

Then, the modulus-operated result may be converted into a homomorphic encryption in operation S640. For example, a homomorphic encryption having the plurality of coefficient values of the polynomial which is the result value of the modulus operation as a plurality of slot values may be output. That is, the coefficients of the polynomial may be a plain sentence message inherent in the encryption.

Then, a modulus operation mod $q_0$ may be performed with the modulus value $q_0$ before converting the homomorphic encryption in operation S650.

As described above, a rebooting method according to the disclosure performed a task of sending a plain sentence value in a slot inside an encryption to a coefficient in an encryption process, and thus there is an effect that the performance time decreases by 35% or more compared to a general rebooting method.

Figure 7:
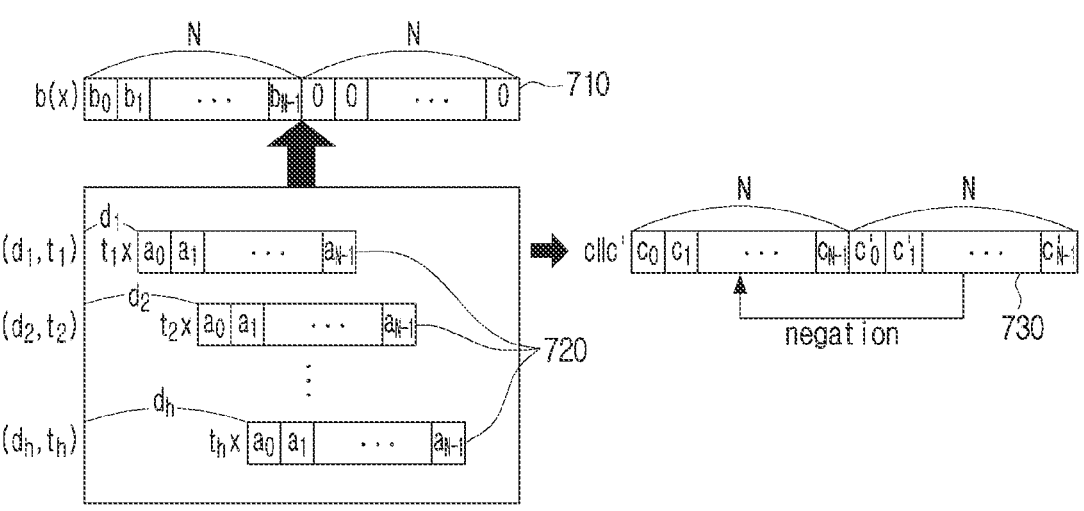
FIG. 7 is a diagram for illustrating a polynomial multiplication operation according to a first embodiment of the disclosure.

FIG. 7 is a diagram for illustrating a polynomial multiplication operation according to a first embodiment of the disclosure. Also, FIG. 8 is a diagram illustrating the operation algorithm in FIG. 7.

FIG. 7 and FIG. 8 illustrate a polynomial multiplication algorithm that performs an operation by increasing a vector size, and hereinafter, it will be referred to as a long sum method.

A long sum method may increase an arrangement space of an iNTT-processed encryption by two times, as illustrated in the drawings. For example, when a homomorphic encryption $b(x)=b_0+b_1 \cdot x+ \ldots +b_{N-1} \cdot x^{N-1}$ goes through a decryption preparation step with an N-1 degree polynomial, it may be expressed as an N dimension vector $b_0, \ldots, b_{N-1}$ of coefficients. The space (or the size) of such an N degree vector may be increased by two times, and 0 may be substituted to the increased space (specifically, the extended space), and a new vector $B=(b_0, \ldots, b_{N-1}, 0, \ldots, 0)$ may be made.

Then, in the method, the coefficient information listed based on the degree information and the homomorphic encryption of which arrangement space was increased are repetitively operated, and the coefficient information is shifted by stages from a low degree of the homomorphic encryption of which arrangement space was increased, and an approximate message in a polynomial form is calculated.

For example, an operation of multiplying a secret key polynomial $s(x)$ stored in the form of order pairs $(d_1, t_1), \ldots, (d_h, t_h)$ to a polynomial $a(x)$ may be performed. Then, a process of shifting the position of the information on the secret key $A=(a_0, \ldots, a_{N-1})$ as much as $d_i$ as in FIG. 7 and adding the information to the vector B may be repeated as much as the number h of the order pairs. When the adding operation process is completed, the increased back portion of the vector B may be multiplied by $-1$, and then added to the front portion, and accordingly, a calculation of $a(x) \cdot s(x)+b(x)$ may be completed.

In the method, the size of the vector B should be increased, and thus the necessary space of the memory is increased by about $N \cdot \log q_0$ bits. However, as the use of branch sentences can be minimized in a process of implementing the algorithm, there is an advantage in the operation speed compared to the method that will be described below.

Figure 9:
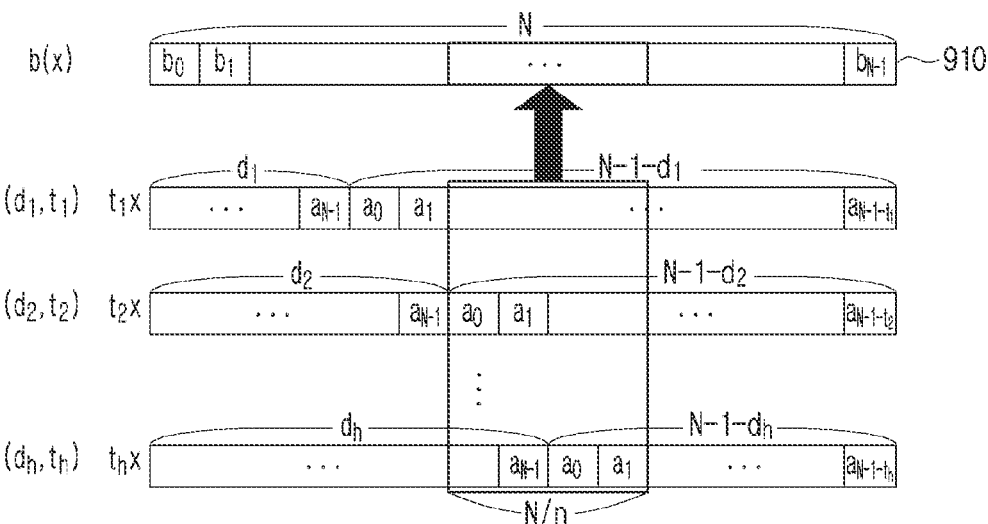
FIG. 9 is a diagram for illustrating a polynomial multiplication operation according to a second embodiment of the disclosure.

FIG. 9 is a diagram for illustrating a polynomial multiplication operation according to a second embodiment of the disclosure. Also, FIG. 10 is a diagram illustrating the operation algorithm in FIG. 9.

FIG. 9 and FIG. 10 illustrate a polynomial multiplication algorithm that performs an operation by dividing sections, and hereinafter, it will be referred to as a Partwise sum method.

First, in the Partwise sum method, an arrangement space of an iNTT-processed homomorphic encryption is divided in a number of n as a plurality of sections. Here, n is a parameter regarding how many sections a vector will be divided into and calculated, and if n is 1, a coefficient vector is calculated as a whole without being divided, and in case n is 2 or 4, a coefficient vector is calculated by dividing the whole vector into two sections and four sections, respectively.

n may be determined as a factor of N which is smaller than N. Hereinafter, it will be assumed that n=2, for concise explanation. Accordingly, divided vectors may be $B_0=(b_0, \ldots, b_{N/2-1})$ and $B_1=(b_{N/2}, \ldots, b_{N-1})$, respectively.

When the vector is divided into a plurality of sections, an operation between the iNTT-processed homomorphic encryption and the coefficient information listed based on the degree information may be performed for each of the plurality of sections, and an approximate message in a polynomial form may be calculated. As an operation is performed for each divided section as described above, the number of times of operations is increased, but only small vectors need to be called in when performing an operation once, and thus the use amount of the space is decreased by $1/n$.

Repetitively, a vector $A=(a_0, \ldots, a_{N-1})$ expressing a polynomial $a(x)$ may be called in every time, and an operation of multiplying $s(x)$ to this polynomial may be performed, and only a portion corresponding to $B_i$ which is a partial vector of $b(x)$ may be separated and added, and an ith partial vector of the final calculation $a(x) \cdot s(x)+b(x)$ may thereby be obtained. In actual implementation, proper decryption can be performed through an appropriate rotation operation without having to call in the vector A every time.

Like in the aforementioned long sum method, if k bits are used in storing a coefficient or storing $d_i$ and $t_i$, the consumed amount of the memory in the above method becomes $2 \times h \times k$ (secret key)$+N \times k$ (vector A)$+(N/n) \times k$ (partial vector $B_i$)$= ((1+1/n) \times N+2 \times h) \times k$ bits.

Considering that, in the case of the conventional method, a storage space of $(2+L) \times N \times k$ bits is needed (L is the number of prime numbers necessary for an RNS method), in the new method, the use amount of the memory decreases as the number n of dividing the vector B increases.

Meanwhile, the method for processing an encryption according to the aforementioned various embodiments of the disclosure may be implemented in forms of program codes for performing each step, and stored in a recording medium and distributed. In this case, a device on which the recording medium is mounted may perform the aforementioned operations such as encryption or encryption processing, etc.

Such a recording medium may be computer-readable media in various types such as a ROM, a RAM, a memory chip, a memory card, an external hard, a hard, a CD, a DVD, a magnetic disc, or a magnetic tape, etc.

So far, the disclosure has been described with reference to the accompanying drawings, but the scope of the disclosure is intended to be determined by the appended claims, and is not intended to be interpreted as being limited to the aforementioned embodiments and/or drawings. Also, it should be clearly understood that alterations, modifications, and amendments of the disclosure described in the claims that are obvious to a person skilled in the art are also included in the scope of the disclosure.

What is claimed is:

1. A method for processing a homomorphic encryption by an electronic apparatus, the method comprising:

receiving, by the electronic apparatus, an input of a homomorphic encryption;

converting, by the electronic apparatus, the homomorphic encryption to an approximate message by using information for a secret key; and outputting, by the electronic apparatus, the approximate message for the input homomorphic encryption, wherein the secret key is expressed as a polynomial having a plurality of terms, and the information for the secret key includes information on degrees and coefficients of the plurality of respective terms, wherein the coefficient information has a value of 1 or $-1$, wherein the secret key includes 64 terms.

2. The method for processing a homomorphic encryption of claim 1, wherein the secret key is a polynomial calculated by using only a last decimal $q_0$ from a predetermined ring.

3. A method for processing a homomorphic encryption by an electronic apparatus, the method comprising:

receiving, by the electronic apparatus, an input of a homomorphic encryption;

converting, by the electronic apparatus, the homomorphic encryption to an approximate message by using information for a secret key; and outputting, by the electronic apparatus, the approximate message for the input homomorphic encryption, wherein the secret key is expressed as a polynomial having a plurality of terms, and the information for the secret key includes information on degrees and coefficients of the plurality of respective terms, wherein-the coefficient information has a value of 1 or $-1$, wherein the converting to the approximate message comprises:

performing inverse Number Theoretic Transformation (INTT) processing on the homomorphic encryption;

operating the iNTT-processed homomorphic encryption and the information for the secret key and calculating an approximate message in a polynomial form; and decoding the calculated approximate message in a polynomial form and calculating the approximate message.

4. The method for processing a homomorphic encryption of claim 3, wherein the calculating an approximate message in a polynomial form comprises:

increasing an arrangement space of the iNTT-processed homomorphic encryption by two times, and repetitively operating coefficient information listed based on the degree information and the homomorphic encryption of which arrangement space was increased and shifting the coefficient information by stages from a low degree of the homomorphic encryption of which arrangement space was increased, and calculating the approximate message in a polynomial form.

5. The method for processing a homomorphic encryption of claim 3, wherein the calculating an approximate message in a polynomial form comprises:

dividing the arrangement space of the INTT-processed homomorphic encryption into a plurality of sections, and performing an operation between the iNTT-processed homomorphic encryption and the coefficient information listed based on the degree information for the plurality of respective sections, and calculating the approximate message in a polynomial form.

6. The method for processing a homomorphic encryption of claim 3, wherein the secret key includes 64 terms.

7. A method for processing a homomorphic encryption by an electronic apparatus, the method comprising:

receiving a first homomorphic encryption by the electronic apparatus;

converting the received first homomorphic encryption into a polynomial;

modulus-operating the polynomial; and converting the modulus-operated result into a second homomorphic encryption, wherein the converting into the polynomial comprises:

using a plurality of slot values inside the received first homomorphic encryption as they are as a plurality of coefficient values of the polynomial;

wherein a public key was calculated by using information for a secret key including information on degrees and the plurality of coefficient values, and the coefficient information has a value of 1 or −1.

8. The method for processing a homomorphic encryption of claim 7, wherein the converting into the second homomorphic encryption comprises:

outputting the second homomorphic encryption having the plurality of coefficient values of the polynomial which is the modulus-operated result as a plurality of slot values.

9. The method for processing a homomorphic encryption of claim 7, wherein the converting into the polynomial comprises:

based on a ratio of an approximate message inside the first homomorphic encryption exceeding a threshold value, converting the encryption into the polynomial.

10. The method for processing a homomorphic encryption of claim 7, wherein the performing a modulus operation comprises:

converting a modulus value of the first homomorphic encryption, and performing a modulus operation for the first homomorphic encryption converted into the polynomial with the modulus value before conversion.

11. The method for processing a homomorphic encryption of claim 7, wherein the secret key includes 64 terms.

12. A method for processing a homomorphic encryption by an electronic apparatus, the method comprising:

receiving an input of a message by the electronic apparatus;

converting the message into a polynomial; and generating a homomorphic encryption by using the polynomial, a public key, and information for a public key encryption multiplier random polynomial, wherein the public key encryption multiplier random polynomial is expressed as a polynomial having a plurality of terms, and the information for the public key encryption multiplier random polynomial includes information on degrees and coefficients of the plurality of respective terms, wherein the public key was calculated by using information for a secret key including the information on degrees and the coefficients of the plurality of respective terms, wherein the secret key includes 64 terms, and the coefficient information has a value of 1 or −1.

13. The method for processing a homomorphic encryption of claim 12, wherein the converting into the polynomial comprises:

using element values of the input message as they are as a plurality of coefficient values of the polynomial.

14. The method for processing a homomorphic encryption of claim 13, wherein the converting into the polynomial comprises:

based on the element values of the message not being integers, rounding off the values and converting the values into integers, and using the values converted into integers as the coefficient values of the polynomial.

15. The method for processing a homomorphic encryption of claim 12, wherein the generating the homomorphic encryption comprises:

generating the homomorphic encryption expressed as a polynomial calculated by using only a last decimal $q_o$ from a predetermined ring.

16. An electronic apparatus comprising:

a memory storing at least one instruction; and a processor executing the at least one instruction, wherein the processor is configured to:

by executing the at least one instruction, when a first homomorphic encryption is received, convert the first homomorphic encryption into an approximate message by using information for a secret key, and store the approximate message at the memory, and the secret key is expressed as a polynomial having a plurality of terms, and the information for the secret key includes information on degrees and coefficients of the plurality of respective terms, wherein-the coefficient information has a value of 1 or −1, wherein the secret key includes 64 terms.

17. The electronic apparatus of claim 16, wherein the processor is configured to:

convert the first homomorphic encryption into a polyno-
mial having a plurality of respective slot values inside
the first homomorphic encryption as coefficient values, modulus-operate the converted polynomial, and convert the modulus-operated result into a second homo-
morphic encryption having the plurality of respective
coefficient values of the modulus-operated polynomial
as slot values.

18. The electronic apparatus of claim 16, wherein the processor is configured to:

convert the approximate message into a polynomial, and
generate the first homomorphic encryption by using the
polynomial, a public key, and information for a public
key encryption multiplier random polynomial, wherein the public key encryption multiplier random
polynomial is expressed as a polynomial having a
plurality of terms, and the information for the public key encryption multiplier
random polynomial includes information on degrees
and coefficients of the plurality of respective terms.

\* \* \* \* \*